Inventor
Donald L. Watrous
by [signature]
His Attorney

United States Patent Office 3,387,143
Patented June 4, 1968

3,387,143
PRESET PULSE COUNTER
Donald L. Watrous, Scotia, N.Y., assignor to General Electric Company, a corporation of New York
Original application Nov. 28, 1961, Ser. No. 155,333, now Patent No. 3,233,116, dated Feb. 1, 1966. Divided and this application Oct. 21, 1965, Ser. No. 511,012
4 Claims. (Cl. 307—225)

ABSTRACT OF THE DISCLOSURE

A circuit for counting a preset number of pulses. The circuit includes a counter storage capacitor, the charge on which capacitor determines the emitter voltage of a unijunction transistor. A charging circuit is provided for establishing a predetermined charge on the storage capacitor, such that the accumulation of a predetermined additional charge on the storage capacitor will cause the unijunction emitter to reach its peak-point voltage at a predetermined pulse count, whereupon the storage capacitor is discharged and output signals are provided at the bases of the unijunction transistor. The additional charge is derived from the pulses to be counted through a resistor-capacitor-diode series circuit.

This invention relates to a preset pulse counter, wherein after a predetermined number of impulses are applied thereto a signal appears at the counter output. More specifically, the invention relates to a preset pulse counter which may be accurately adjusted to provide an output signal after a predetermined number of input pulses, and which is not sensitive or is only negligibly sensitive to the input pulse characteristics such as pulse width, magnitude, spacing, or polarity.

The present application is a division of application Ser. No. 155,333, filed Nov. 28, 1961, now Patent No. 3,233,116.

In many applications, it is desirable to be able to produce consistently a predetermined number of identical power pulses. This is particularly true in the field of welding in order to assure that the welds produced thereby are of consistent quality. While in the past capacitor discharge welders have been mainly used to produce single power pulses, in this type of welder the capacitor ages with time and does not produce consistently identical power pulses so that under such conditions inferior welds result.

In the past, sine wave welders have also been employed to obtain repetitive or multipulses of power. While this type of control is useful, it has several limitations. Since the control is dependent on the power supply frequency, the repetition rates of pulses are limited to every cycle of power or at most every half-cycle.

An object of this invention is the provision of an improved preset pulse counter which can accurately count pulses and, after a prescribed number of pulses, automatically inhibit the generation of further pulses.

In a multipulse power supply, a control circuit actuated by control means or contacts initiates a cycle of operations in which a first semiconductor device employed as a controlled rectifier becomes conductive and conducts current through an output transformer to welding electrodes, while a second controlled rectifier, which determines the pulse width, remains non-conducitve. After the first rectifier has conducted for the prescribed pulse width time as determined by a pulse width timing circuit, the control circuit brings the second rectifier into a conductive state, making the first rectifier non-conductive. The two rectifiers are alternately made conductive by a pulse spacing timing circuit and a pulse width timing circuit, respectively, to produce multipulses of power. In meeting the object set forth above preset pulse counter counts the number of pulses and at the end of the preset number automatically ceases operation of the power supply.

The invention together with further objects and advantages thereof, may best be understood by reference to the following description when considered in connection with the accompanying drawings, wherein like parts in the two figures are identified by the same reference character, and wherein.

An example showing the use of the power supply, of which the preset pulse counter this invention is a part to produce a superior weld is more fully described in copending application of John D. Harnden, Jr., Ser. No. 155,431, now abandoned, filed concurrently with application Ser. No. 155,333, filed Nov. 28, 1961, of which this application is a division, and which is assigned to the same assignee.

Figure 1:
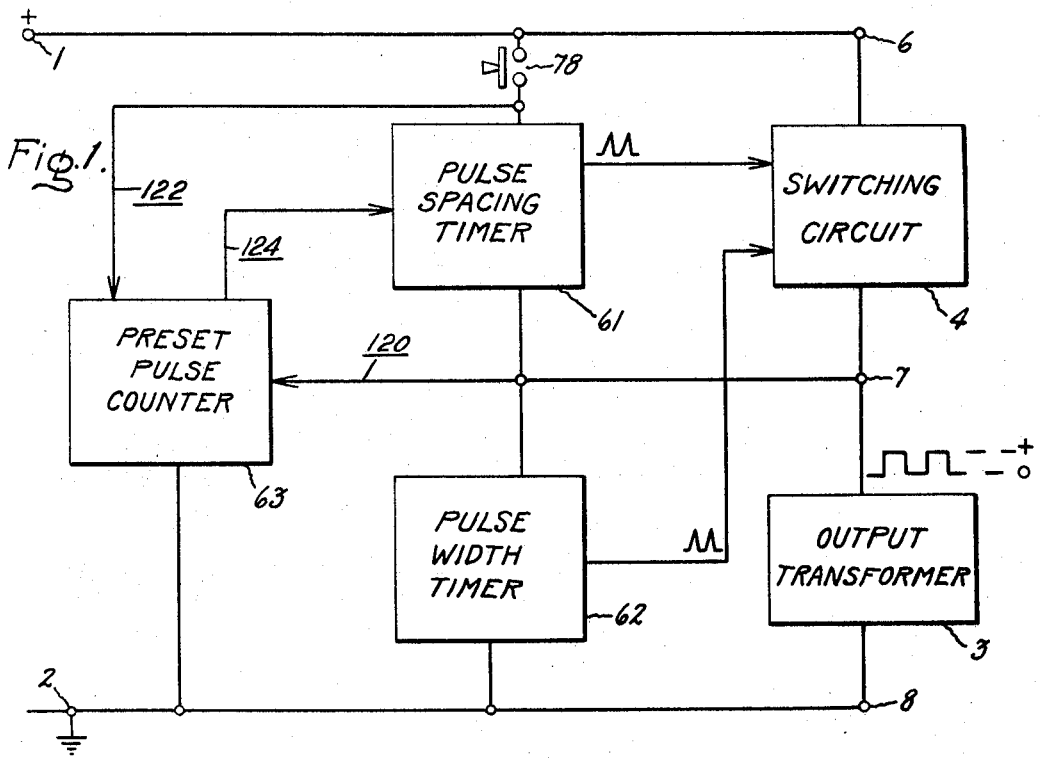
FIGURE 1 is a block diagram illustrating the components of a multipulse power supply including an embodiment of the present pulse counter of this invention.

FIGURE 1 is a block diagram of the multipulse power supply. The conduction of a first controlled rectifier in switching circuit 4 switches point 7 to point 6, thereby placing the direct current bus potential 1, 2 across an output transformer 3 and initiating a power pulse to the output transformer. Conduction of a second controlled rectifier in switching circuit 4 causes the first controlled rectifier to become non-conductive and switches point 7 to point 8, thereby placing the bus potential across the switching circuit 4 and ceasing current flow to the output transformer. The pulse width timer 62 determines when the second controlled rectifier will become conductive. The pulse spacing timer 61 determines when the first controlled rectifier will become conductive in order to generate the next power pulse. The preset pulse counter 63 is set to count the number of power pulses that are required for the particular weld to be performed. At this preset number, the counter provides a signal which inhibits generation of any further power pulses by the switching circuit 4.

Figure 2:
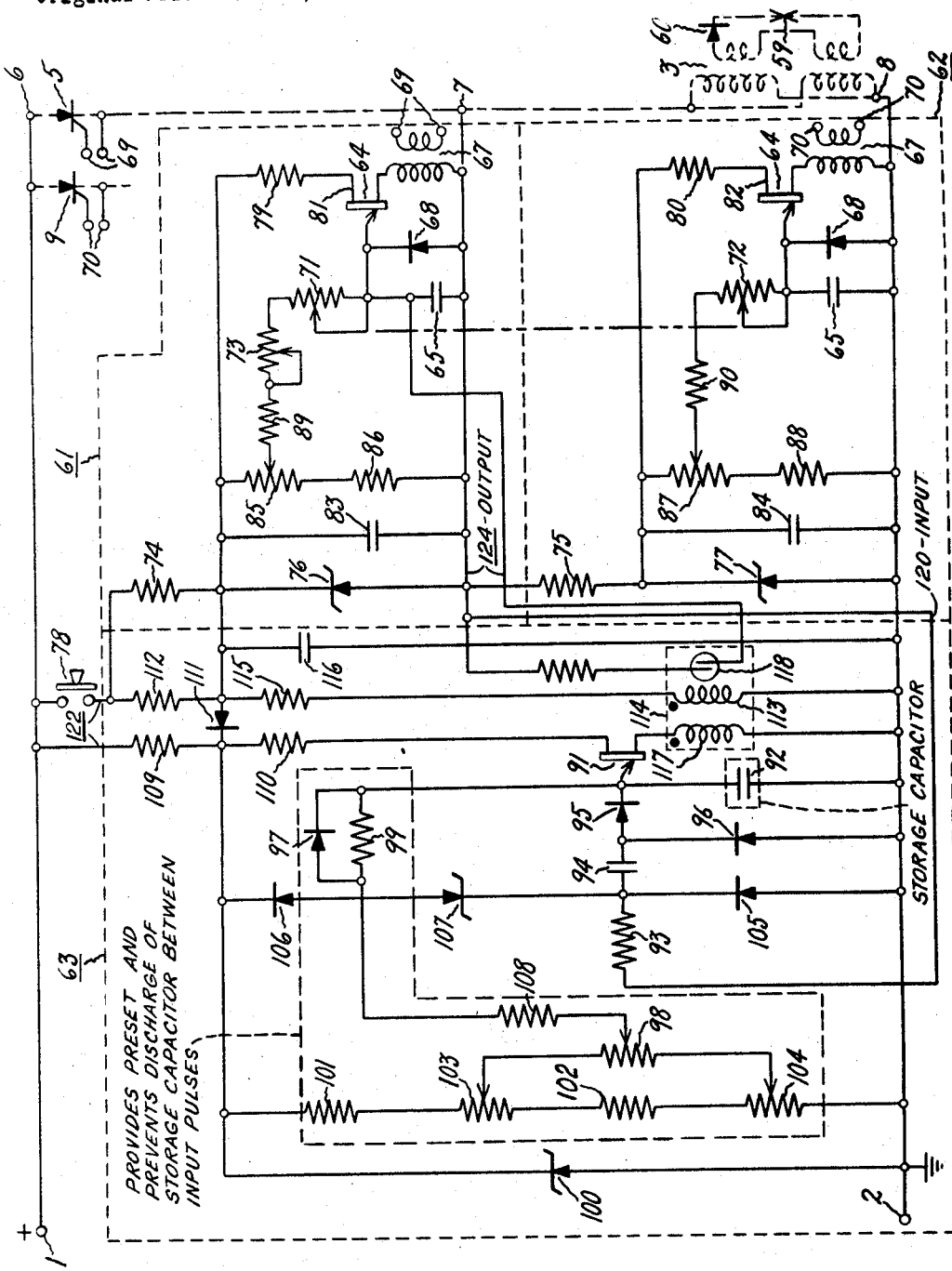
FIGURE 2 is a circuit diagram illustrating the preset pulse counter of this invention and other components of the multipulse power supply shown in the FIGURE 1 block diagram.

FIGURE 2 shows the timing control circuit which regulates the switching circuit 4. The switching circuit 4 is more fully shown and described in aforementioned Patent No. 3,233,116. Reference should be made to FIGURE 1 of Patent No. 3,233,116 wherein the switching circuit is designated as a whole by the numeral 4, and which shows the connections made to a first controlled rectifier 5 and a second controlled rectifier 9, and to the specification at columns 2 and 3. The pulse spacing timer designated as a whole by numeral 61 regulates the time at which the first controlled rectifier 5 becomes conductive. The pulse width timer designated as a whole by numeral 62 regulates the time at which the second controlled rectifier 9 becomes conductive. The preset pulse counter 63 determines the number of power pulses to be produced by the first controlled rectifier 5 for a particular welding operation.

The pulse spacing timer 61 and the pulse width timer 62 have identical oscillator portions. Identical elements of the oscillator portions are shown in the pulse spacing timer 61 and in the pulse width timer 62 by the numerals 64, 65, 67, 68. The output of the pulse transformer 67 in the pulse spacing timer 61, which initiates conduction of the first controlled rectifier 5, is designated by numeral 69. The output of pulse transformer 67 in the pulse width timer 62, which initiates conduction of the second controlled rectifier 9 is designated by numeral 70. Potentiometers 71 and 72 in the pulse spacing and pulse width timer circuits respectively, are shown as being mechanically coupled but they could be separately adjustable. The adjustment of potentiometers 71 and 73 in the pulse spacing timer 61 determines the period of time between power pulses in the output transformer 3. The adjustment of the potentiometer 72 in the pulse width timer 62 determines the power pulse width. The remaining elements in the pulse spacing timer 61 and the pulse width timer 62 are similar and serve the same function. Thus, resistors 74 and 75 and Zener diodes 76 and 77, which are all connected in series across the bus conductors 1, 2 through control contacts or pushbutton 78, furnish the desired voltage across each respective circuit. Resistors 79 and 80 which are connected to bases 81 and 82 of the unijunction transistors 64 limit the base current of these unijunction transistors. Filter capacitors 83 and 84 are connected across Zener diodes 76 and 77 respectively. Potentiometer 85 and resistor 86 which are connected in series across capacitor 83, and potentiometer 87 and resistor 88 which are connected in series across capacitor 84 determine the voltage to be applied to the timing capacitors 65. Resistors 89 and 90 which are connected to points on potentiometers 85 and 87, respectively, primarily determine the resistor-capacitor time constant for charging up the timing capacitors 65.

The unijunction transistor's switching characteristics, combined with the stable tripping voltage and relatively large peak power handling capabilities, makes it very useful in counting circuits. In FIGURE 2 unijunction transistor 91 is used in the preset pulse counter designated as a whole by numeral 63. In this circuit, counter storage capacitor 92 is connected between the emitter of unijunction transistor 91 and ground. For each power pulse generated at point 7, the counter storage capacitor accumulates some additional positive charge through the series network consisting of input terminal 120, resistor 93, capacitor 94, and diode 95. The time constant as determined by resistor 93 and capacitors 92 and 94 is chosen so that the charging current will cease during the pulse. Capacitor 94 is typically much smaller than capacitor 92. In order to count power pulses of various widths, diode 96 is connected from the junction of capacitor 94 and diode 95 to ground, and in conjunction with resistor 93, forms a discharge path for capacitor 94 after each pulse. The counting capacity of the preset pulse counter is adjusted by varying a preset voltage below the unijunction transistor peak point voltage. Automatic preset of capacitor 92 is achieved by the use of diode 97 which is connected to the emitter of unijunction transistor 91. At the end of a counting cycle the storage capacitor 92 is discharged due to the switching action of the unijunction transistor 91. This switching action occurs when the voltage at the emitter of the transistor reaches the peak point voltage. Capacitor 92 can now be charged quickly to its preset voltage through the low forward resistance of diode 97. At the end of the first counting pulse, the cathode of diode 97 assumes a positive voltage due to the positive charge on capacitor 92, and diode 97 thus represents a very large resistance. Thus, the counter storage capacitor 92 does not discharge between pulses and the effect of pulse spacing time, is therefore, negligible. However, when a lower value of preset voltage is selected by potentiometer 98, the capacitor 92 is prevented from discharging by diode 97. By shunting diode 97 with resistor 99 the necessary discharge path is provided. The counter is now, however, sensitive to pulse spacings. This effect is negligible if the pulse spacing time is small, and can be made negligible for wider pulse spacing time by the proper choice of value of resistor 99. The capacitor could, of course, be preset to the lower voltage by omitting resistor 99 and actuating pushbutton 78.

The preset voltage is obtained from potentiometer 98 which is connected to the voltage regulating circuit comprised of Zener diode 100 in parallel with resistors 101, 102 and potentiometers 103, 104.

By adjusting the preset voltage to different values, the counting capacity of the circuit can be changed.

With the addition of diode 105, which is connected between the junction of resistor 93 and capacitor 94 and ground, the counting circuit can operate satisfactorily with bi-polarity pulses. Diode 105, by having its anode at ground potential, prevents capacitor 94 from obtaining a negative charge, thereby eliminating the negative pulses. Diode 106 in series with Zener diode 107 is connected from one side of Zener diode 100 to diode 105. Diode 106 acts to clip the positive pulses to a voltage determined by the voltages of Zener diode 100 plus Zener diode 107. Resistor 108, which is connected between potentiometer 98 and resistor 99, limits current to prevent unijunction transistor 91 from becoming bistable. Resistor 109, which is connected between the bus conductor 1 through a power supply terminal 122 and Zener diode 100 permits excitation of this Zener diode when pushbutton 78 is open. Resistor 110 limits the base current of unijunction transistor 91. Diode 111 and resistor 112 which are connected at one end through another power supply terminal 122 and pushbutton 78 to bus conductor 1, regulate the voltage on the bias winding 113 of glass reed switch 114. Diode 111 maintains the voltage at the point between resistors 112 and 115 at the regulated voltage of Zener diode 100. Capacitor 116, connected in parallel with resistor 115 and bias winding 113, prevents transients from being coupled back to the unijunction transistor 91 through the bias winding 113 and pulse winding 117 of glass reed switch 114. When the unijunction transistor 91 conducts after reaching the correct pulse count, the current through the pulse winding 117 of reed switch 114 overcomes the bias winding 113 ampere turns, thereby closing contacts 118, shorting output terminals 124, and timing capacitor 65, which is connected across the output terminals 124, thereby inhibiting the pulse spacing timer 61 from producing any more pulses with which to render conductive the first controlled rectifier 5.

From the foregoing description, it can be appreciated that the invention makes available a new and improved pulse counter which when used in conjunction with a multipulse power supply adjustably controls the number of pulses supplied to the power supply load, such as a welding transformer, each time the pulse counter is energized. The novel preset pulse counter in this invention regulates the number of pulses by employing a unijunction transistor which permits a very accurate pulse count to be maintained, such that when it is used with a welding power supply, superior welds result.

Having described a new and improved preset pulse counter construction in accordance with the invention, it is believed obvious that other modifications and variations of the invention are possible in light of the above teachings. For example, other devices whose volt-ampere characteristics are similar to the unijunction transistor, such as tunnel diodes or gas discharge lamps, may be used rather than the unijunction transistor. Also, other switching devices, such as relays, semiconductors and photoresistors could be used in place of the glass reed switches disclosed herein. The preset pulse counter of this invention is not limited to use with welding power supplies and is useful wherever it is desired to count a predetermined number of pulses. It is, therefore, to be understood that changes may be made in the particular embodiment of the invention described which are within the full intended scope of the invention as defined by the following claims.

What I claim as new and desire to secure by Letters Patent of the United States is:

1. A preset pulse counter circuit comprising a semiconductor device, said semiconductor device being energized by a source of direct current, a storage capacitor being connected at the input to said semiconductor device, a charging circuit for said storage capacitor, said charging circuit being connected to a source of pulses, means for eliminating negative pulses of bi-polarity pulses, further means to preset said storage capacitor to obtain a desired pulse count and prevent discharge of said storage capacitor between pulses.

2. A preset pulse counter circuit comprising a unijunction transistor, first and second bases of said unijunction transistor being connected to a source of direct current, a storage capacitor being connected at the emitter of said transistor, a resistor, a second capacitor, and diode series circuit to charge said storage capacitor from a source of pulses, a second diode being connected intermediate the second capacitor and diode in said series circuit to discharge said second capacitor between pulses, a third diode being connected intermediate the resistor and second capacitor in said series circuit for eliminating negative pulses of bi-polarity pulses, a parallel combination of a second resistor and a fourth diode being connected between a source of preset voltage which determines the preset pulse count and the emitter of said unijunction transistor whereby said storage capacitor is quickly charged to a preset value determined by the preset voltage through said fourth diode, and the time constant determined by said second resistor and said storage capacitor prevents appreciable discharge of said storage capacitor between pulses.

3. A preset pulse counter circuit comprising a semiconductor device, said semiconductor device being energized by a source of direct current, a storage capacitor being connected at the input to said semiconductor device, a charging circuit for said storage capacitor, said charging circuit being connected to a source of pulses, a first means connected to said charging circuit for eliminating negative pulses of bi-polarity pulses, a second means connected to said charging circuit to limit the voltage of the pulses provided by the source of pulses, a third means to preset said storage capacitor to obtain a desired pulse count and prevent discharge of said capacitor between pulses, whereby the desired pulse counter is provided for pulses of varying magnitude, width, spacing, and polarity.

4. A preset pulse counter circuit comprising a semiconductor device, said semiconductor device being energized by a source of direct current, a storage capacitor being connected at the input to said semiconductor device, a series charging circuit including a second capacitor and a first diode being connected to charge said storage capacitor from a source of pulses, said first diode being connected between said storage capacitor and said second capacitor, a second diode being connected intermediate said second capacitor and said first diode in said series circuit to discharge said second capacitor between pulses, a first means being connected to said series charging circuit for eliminating negative pulses of bi-polarity pulses, a second means being connected between a source of preset voltage which determines the preset pulse count and the input to said semiconductor device whereby said storage capacitor is quickly charged to a preset value determined by the preset voltage, and which second means prevents appreciable discharge of said storage capacitor between pulses.

References Cited
UNITED STATES PATENTS

| | | | |
|---|---|---|---|
| 3,021,438 | 2/1962 | Moore et al. | 307—88.5 |
| 3,111,591 | 11/1963 | Conron et al. | 307—88.5 |
| 3,121,803 | 2/1964 | Watters | 307—88.5 |

JOHN S. HEYMAN, *Primary Examiner.*